F. R. BANKS.
GATE VALVE.
APPLICATION FILED AUG. 10, 1910.

992,933.

Patented May 23, 1911.

Inventor
Frederick R. Banks.

UNITED STATES PATENT OFFICE.

FREDERICK R. BANKS, OF PATERSON, NEW JERSEY.

GATE-VALVE.

992,933.  Specification of Letters Patent.  Patented May 23, 1911.

Application filed August 10, 1910. Serial No. 576,589.

*To all whom it may concern:*

Be it known that I, FREDERICK R. BANKS, citizen of the United States, residing at Paterson, New Jersey, have invented certain new and useful Improvements in Gate-Valves, of which the following is a specification.

My present invention relates to improvements in gate valves and has, among others, for its object to provide a simple, economical and efficient construction capable of being easily cleaned or repaired.

The invention includes the novel features of construction and arrangement and combination of parts hereinafter described and particularly set forth in the appended claim.

An embodiment of the invention is shown in the accompanynig drawings in which—

Figure 1:
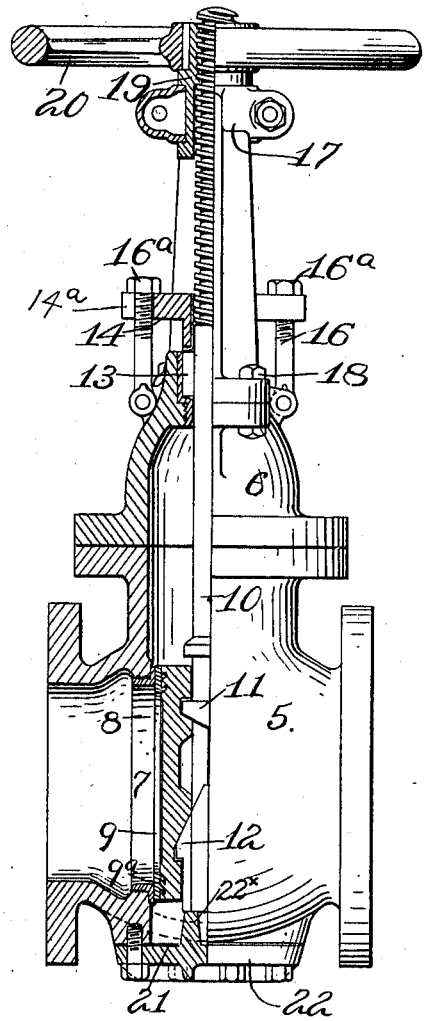
Figure 2:
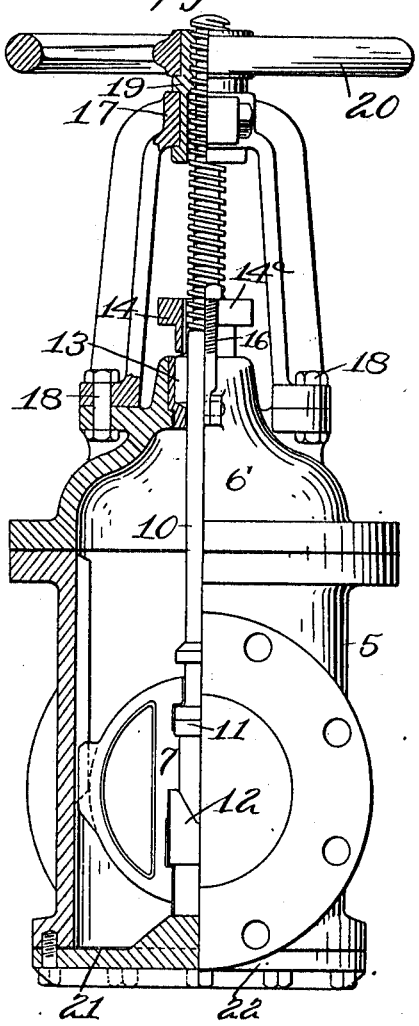
Figure 3:
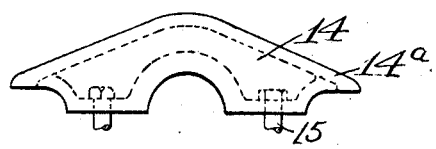
Figure 4:
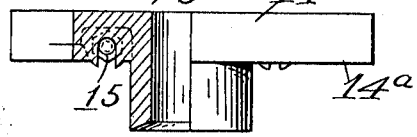

Figure 1 is a side elevation partly in section. Fig. 2 is a view similar to Fig. 1, a quarter turned, and Figs. 3 and 4 are detail views.

Referring by reference characters to this drawing the numeral 5 designates the valve case or shell, designed to be interposed between two pipe sections in the ordinary manner and being provided at the top with the hollow cap 6, into which recess the valve moves when the latter is in open position.

7 designates the valve gates, only one being shown, which coact with valve seats 8 preferably secured to the valve case by a threaded connection as shown. The gates are also provided with seats 9 designed to coact with the seats 8, being preferably secured to the valves by inwardly extending angularly turned projections $9^a$ forced into corresponding recesses in the valves.

The valve stem or rod is shown at 10 and is provided with upper and lower members 11 and 12 coacting with corresponding recesses in the valves, the lower member 12 acting as a spreader and tending when turned to force the valves firmly against their seats, said cam members having right angular upper and lower shoulders respectively for causing vertical movement of the valves as the rod is moved vertically.

At the point where the rod passes through the cap there is provided a stuffing box 13, the gland 14 of which is made in two parts, embracing the rod between them, and held together by screws 15. The horizontal flanges $14^a$ of the gland are notched or recessed to receive the swinging bolts 16 hinged to the cap and provided with clamp nuts $16^a$. Surmounting the cap is a yoke 17, the lower ends of the arms of which are secured to the cap in suitable manner as by bolts 18. In the upper end of the yoke is rotatably mounted or journaled a threaded sleeve or nut 19 to which is secured a hand wheel 20, the valve stem or rod having a screw threaded portion passing through and engaging the sleeve or nut.

At its lower end the valve case is provided with an opening 21 of a diameter more or less in excess of the diameter of the valves or disks, which opening is closed by a cap plate or cover 22. By this construction the disks and spindle may be readily removed from the valve casing without disturbing the surmounting operating parts, thus enabling the valve to be easily cleaned or reground or repaired, as it will be noticed that the spindle may be disconnected from the sleeve by turning the latter until the screw is disengaged therefrom.

The operation of the device is as follows: The movement of nut 19 causes the rod 10 to move vertically until it strikes the abutment $22^x$ on plate 21. This causes the screw threads of the nut and rod to become jammed and further rotation of the hand wheel will cause the nut and rod to rotate together. The rotation of the rod causes the cam member 12, which is eccentric to the rod, to push the valve gates against their seats, as shown in Fig. 1. To raise the gates it is simply necessary to rotate the hand wheel in an opposite direction so as to partially rotate the rod to release the gate from the cam member, when further rotation of the wheel will cause the rod to rise and the member 11 will carry the gates up with the rod. By having the opening 21 so that all the interior parts may be removed therethrough, it is not necessary to have the cap 6 removable, as the casing 5 and cap may be made in one piece.

Having thus described my invention what I claim is:

In a gate valve, a casing having valve seats therein, disk valves coöperating with said seats, a rod independent of the valves and having projections thereon engaging with the valves to open and close them, detachable means for moving the rod, said casing having an opening in its bottom in line with said valves and rod and through which the same may pass, and a removable cover for closing said opening to the casing.

In testimony whereof, I affix my signature in presence of two witnesses.

FREDERICK R. BANKS.

Witnesses:
M. D. HANCE,
A. E. SWAYER.

Copies of this patent may be obtained for five cents each, by addressing the "Commissioner of Patents. Washington, D. C."